United States Patent [19]

Briggs et al.

[11] Patent Number: 5,060,182

[45] Date of Patent: Oct. 22, 1991

[54] METHOD AND APPARATUS FOR PERFORMING THE SQUARE ROOT FUNCTION USING A RECTANGULAR ASPECT RATIO MULTIPLIER

[75] Inventors: Willard S. Briggs, Carrollton; Thomas B. Brightman, Plano; David W. Matula, Dallas, all of Tex.

[73] Assignee: Cyrix Corporation, Richardson, Tex.

[21] Appl. No.: 402,822

[22] Filed: Sep. 5, 1989

[51] Int. Cl.$^5$ ............................................. G06F 7/38
[52] U.S. Cl. .................................................. 364/752
[58] Field of Search .................... 364/752, 736, 715.01, 364/729

[56] References Cited

U.S. PATENT DOCUMENTS

| | | | |
|---|---|---|---|
| 4,338,675 | 7/1982 | Palmer et al. | 364/748 |
| 4,734,878 | 3/1988 | Sutcliffe | 364/752 |
| 4,757,467 | 7/1988 | Dieterich et al. | 364/752 |
| 4,878,190 | 10/1989 | Darley et al. | 364/752 |
| 4,901,267 | 2/1990 | Birman et al. | 364/736 |

OTHER PUBLICATIONS

IEEE Standard for Binary Floating-Point Arithmetic ANSI/IEEE—Std. 754—1985 (no date).
Coonen, J. T., "Specifications for a Proposed Standard for Floating Point—Arithmetic", Oct. 13, 1978.
Fandrianto, Jan, "Algorithm for High Speed Shared Radix 4 Division and Radix 4 Square Root", IEEE, 1987, 73–79.
Ramamoorthy et al., "Some Properties of Iterative Square Rooting Methods Using High-Speed Multiplication", IEEE Trans. Comput., (1972) C-21:837–847).
Taylor, George S., "Compatible Hardware for Division and Square Root", IEEE, 1981—127–134.
Parikh, S., "An Architecture for a Rational Arithmetic Unit", Dissertation, Univ. of Bombay, 1978, Univ. of Tex. at Arlington, 1981.

Primary Examiner—Dale M. Shaw
Assistant Examiner—Tan V. Mai
Attorney, Agent, or Firm—Baker & Botts

[57] ABSTRACT

A method and apparatus for performing the square root function which first comprises approximating the short reciprocal of the square root of the operand. A reciprocal bias adjustment factor is added to the approximation and the result truncated to form a correctly biased short reciprocal. The short reciprocal is then multiplied by a predetermined number of the most significant bits of the operand and the product is appropriately truncated to generate a first root digit value. The multiplication takes place in a multiplier array having a rectangular aspect ratio with the long side having a number of bits essentially as large as the number of bits required for the desired full precision root. The short side of the multiplier array has a number of bits slightly greater by several guard bits than the number of bits required for a single root digit value, which is also determined to be the number of bits in the short reciprocal. The root digit value is squared and the exact square is subtracted from the operand to yield an exact remainder. Succeeding new root digit values are determined by multiplying the short reciprocal by the appropriately shifted current remainder, selectively adding a digit bias adjustment factor and truncating the product. The root digit values are appropriately shifted and accumulated to form a partial root. The described steps are repeated to serially generate root digit values and partial roots with corresponding new exact remainders.

92 Claims, 4 Drawing Sheets

FIG. 4b $$\sqrt{\begin{array}{cccccccc}1. & 4 & 1 & 4 & 2 & 1 & 3 & 5 & 6 \\ 2. & 00 & 00 & 00 & 00 & 00 & 00 & 00 & 00\end{array}}$$

$d_0 : 1$ $2d_0 + d_1 : 2\ \underline{4}$ $2(d_0 + d_1) + d_2 : 2\ 8\ \underline{1}$ 2 8 2 $\underline{4}$ 2 8 2 8 $\underline{2}$ 2 8 2 8 4 $\underline{1}$ 2 8 2 8 4 2 $\underline{3}$ 2 8 2 8 4 2 6 $\underline{5}$ 2 8 2 8 4 2 7 0 $\underline{6}$

EXAMPLE: √2

EXAMPLE: √20

$$\sqrt{\begin{array}{cccccccc}4. & 4 & 7 & 2 & 1 & 3 & 5 & 9 & 5 \\ 20. & 00 & 00 & 00 & 00 & 00 & 00 & 00 & 00\end{array}}$$

```
   16
    4 00
    3 36
      64 00
      62 09
       1 91 00
       1 78 84
         12 16 00
          8 94 41
          3 21 59 00
          2 68 32 69
            53 26 31 00
            44 72 13 25
             8 54 17 75 00
             8 04 98 43 81
               49 19 31 19 00
               44 72 13 59 25
                4 47 17 59 75
```

METHOD AND APPARATUS FOR PERFORMING THE SQUARE ROOT FUNCTION USING A RECTANGULAR ASPECT RATIO MULTIPLIER

TECHNICAL FIELD OF THE INVENTION

This invention relates in general to the field of performing mathematical functions using electronic devices. More specifically, the present invention relates to a method and apparatus for performing the square root function in a system using a rectangular aspect ratio multiplier circuit.

BACKGROUND OF THE INVENTION

The arithmetic unit is one of the most important components of any integrated electronic data processing system. Arithmetic units perform a wide variety of mathematical functions upon operands which are transmitted from other portions of an integrated system. The basic addition, subtraction and multiplication functions are quickly and efficiently performed in arithmetic units today. However, presently available techniques for performing the exact square root function have not been completely satisfactory with respect to efficiency and speed.

The term exact square root is used to describe results equivalent to those produced by the common longhand square root process, i.e., a positive value for the partial root and a "remainder" which, if non negative, is strictly less than twice the partial root plus one unit in the last place (or twice the root minus one, if negative), such that, in infinite precision, the sum of the partial root squared and the remainder is exactly equal to the operand.

An exact square root provides a result more useful than an approximate square root of bounded error. The exact square root provides the basis for implementation of infinitely precise roundings such as specified by IEEE-754-1985. Furthermore, the partial root and remainder composing the exact square root provides a starting point for initiating subsequent higher precision determination of an exact square root without reference to the original operand. Neither of these features are obtained from an approximate square root of bounded but indeterminant error.

One technique to find the exact square root is a binary version of the common longhand square root method. This method suffers from the drawback that each iteration contributes only 1 to 3 bits of the partial root and requires many iterations as the precision of the operand is increased. However, it does produce an exact square root suitable for precise rounding.

Another currently available system employs a square root method using a Newton-Raphson approximation technique. In this system, an approximation of the reciprocal of the root is calculated using an iterative process to achieve an approximate value for the reciprocal in a full precision format. The full precision reciprocal approximation is then multiplied by the full precision operand to achieve a full precision estimate of the root. Only a bound on the indeterminate error of the estimated root is known and this information is inadequate for implementation of precise rounding. To obtain the exact square root, the indeterminacy in the error is removed by a second full precision multiplication. In the second full precision multiplication step, the approximate root is multiplied by itself and an exact difference is computed between the operand and the approximate root squared. This information is then sufficient to allow for recovery of the remainder and/or to obtain appropriate precise rounding procedures. Thus, the Newton-Raphson exact square root requires two full precision multiplies which are time consuming.

Therefore, a need has arisen for a system which uses a square root process which results in an exact square root which can be used for appropriate precise rounding procedures, but which is less time consuming than and more efficient than previously developed systems.

SUMMARY OF THE INVENTION

In accordance with the present invention, a square root method and system are provided which substantially eliminate or reduce disadvantages and problems associated with prior arithmetic techniques used to perform the exact square root function.

The square root system of the present invention first determines an approximation of the reciprocal of the root, biases, and truncates it; hereinafter referred to as the short reciprocal, accurate to a number of bits needed to substantially fill the smaller side of a rectangular aspect ratio multiplier circuit. The square root system then develops root digit values corresponding to a very large radix. This large radix is substantially equal to the number of bits of the smaller side of the rectangular multiplier. The precision required for the short reciprocal is limited to one digit in this large radix plus appropriate guard bits. Importantly, the error in the short reciprocal can be left indeterminate as only a bound on the error of the reciprocal value is needed for the process, thus eliminating a time consuming feature of the Newton-Raphson exact square root process. Each root digit value is determined by multiplying the short reciprocal of the root by the remainder in the rectangular multiplier and appropriately truncating the result. The root digit values are determined serially with corresponding exact remainders. Each root digit value determined by the technique is one of at most two possible values in the large radix system where the new signed remainder corresponds to less than a unit of value in the last place of the root digit value determined. Such signed remainders are then sufficient for simplified implementation of precise roundings such as specified by IEEE-754-1985. Through this use of a rectangular multiplier, no subsequent full precision multiplication steps are required.

An important technical advantage of the present invention inheres in the fact that it uses a rectangular aspect ratio multiplier circuit. The use of the rectangular multiplier saves time in several places in the square root process. Each of the multiplication steps used to form the root digit values are much simpler short-by-long multiplications. More importantly, the multiplication and subsequent subtraction necessary to form the new exact remainder can all be accomplished by a single application of the rectangular multiplier. Further time savings result from the fact that the initial estimation of the reciprocal of the root need only be estimated to the precision of the shorter side of the rectangular multiplier. This saves the multiplication steps necessary in the Newton-Raphson iterations to expand the accuracy of the estimation to a full precision width, as well as saving the subsequent full precision multiplications employed to remove the indeterminacy in the root approximation.

BRIEF DESCRIPTION OF THE DRAWINGS

A more complete understanding of the present invention may be acquired by referring to the detailed description and claims when considered in connection with the accompanying drawings, wherein:

DETAILED DESCRIPTION OF THE INVENTION

The arithmetic unit of the present invention uses a novel method for performing the square root function. This method is shown in flow chart form in FIG. 1. The method illustrated is specially suited to operate in an arithmetic unit which comprises a rectangular aspect ratio multiplier. The arithmetic unit of the present invention may comprise, for example, a rectangular multiplier having an aspect ratio of $19 \times 69$ bits. This multiplier may be used to perform the exact square root of 68 bit numbers by generating four 17-bit root digits. The desired full precision 68 bit partial root with non-negative remainder is viewed in the method of the present invention as composed of four signed 17-bit digits employing the large radix $2^{17}$.

Figure 1:
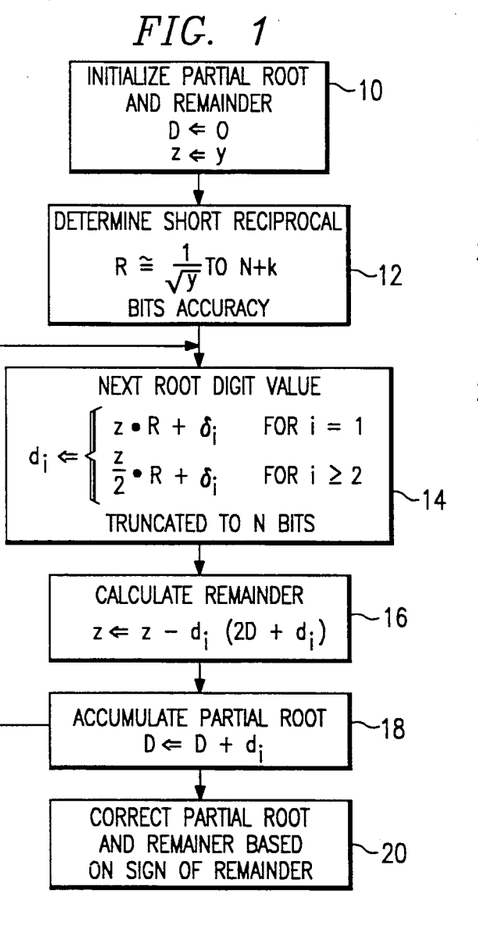
FIG. 1 is a flow chart illustrating the method of performing the square root function used in the arithmetic system of the present invention.

The method shown in FIG. 1 is used to calculate the square root of an operand y. The operand y is normalized such that $\frac{1}{4} \leq y < 1$ and the value of its exponent is an even number. The square root function takes place by approximating the reciprocal of the root to a precision less than the precision of the operand to obtain a short reciprocal R. Root digit values, $d_i$, are serially determined and accumulated to generate a partial root D. Remainders are generated and stored in a register z. The method will be described with reference to an array multiplier having an aspect ratio of $19 \times 69$ bits. It should be understood, however, that the square root method of the present invention is applicable to a wide range of rectangular aspect ratio multipliers. The particular rectangular multiplier described herein is an embodiment chosen for the purposes of teaching the present invention, and should not be construed to limit the scope of the present invention.

Referring to FIG. 1, the method begins at step 10 wherein the remainder register z is loaded with the value of the operand y and the root register is set to zero. It should be understood that the method presupposes that the operand is a 68 bit number normalized to than one and the most significant bit of the 69 bit remainder register z, being the sole bit to the left of the binary radix point, is initially equal to 0. The method then proceeds to step 12 where the short reciprocal R of the root is determined to $(N+k)$ bits of accuracy. N is determined to be the number of bits in the large radix associated with the root digits. Here $N=17$, and k is a limited number of guard bits, for example, k here equals 2. According to the present embodiment, the short reciprocal R approximates the exact reciprocal to more than 18 bits of accuracy. The short reciprocal R is always greater than or equal to the true reciprocal $1/\sqrt{y}$, where the true reciprocal is greater than one and less than or equal to two. The approximation step 12 uses a variation of the Newton-Raphson approximation technique which will be described more fully with reference to FIG. 2.

A first root digit value is calculated in step 14 by multiplying the operand now in the remainder register z by the short reciprocal R, generating a product 88 bits wide with at least one leading zero. The product of the short reciprocal and the operand then has a digit bias adjustment factor $\delta_1$ added to it. In an embodiment of the present invention using a multiplier having an aspect ratio of $19 \times 69$ bits, $\delta_1$ is equal to $\frac{3}{8}$ of a unit relative to a unit in the last place to which the root digit value is truncated. The digit bias adjustment factors $\delta_1$, $\delta_2$, $\delta_3$ and $\delta_4$ are statically generated correction factors which are added to offset error resulting from the truncation of the products to form the signed 17-bit root digit values. The digit bias adjustment factor $\delta_i$ is added in to form the root digit value only if the root digit value being calculated is positive, observing that root digit values after the first may be negative. This limitation on adding $\delta_i$ is due to the fact that digit truncation error reduces magnitude, and thus acts to reduce root value for positive root digit values and acts to increase the root value for negative root digit values. Different digit bias adjustment factors are selectively added in the first root digit value computation as opposed to the second, third and fourth root digit value computations. In the present embodiment, the digit bias adjustment factors, $\delta_2$, $\delta_3$, $\delta_4$, are all equal to $\frac{1}{2}$ a unit in the last place relative to truncation, and are added in the second, third and fourth root digit value computations before truncation only if the resulting root digit values will be positive. In step 14, the sum of the product of the z register shifted to the right one place for root digit values after the first and the short reciprocal and the appropriate digit bias adjustment factor $\delta_i$ is then truncated to form a single signed 17-bit root digit value. The term digit is used herein with reference to the large radix $2^{17}$ and, without regard to normalization, corresponds to any positive or negative integer value having a magnitude of $2^{17}-1$ or less. In the case of a rectangular aspect ratio of $19 \times 69$ bits, four root digit values are required for the complete 68-bit root of a 68-bit operand. Thus, four passes through the multiplier will be required to generate the four root digit values. According to the present embodiment, the ith signed 17-bit integer digit determined is taken to have a binary radix point $17(i-1)$ places to the left of its leftmost bit in specifying the corresponding root digit value. This corresponds to the fact that the infinitely precise root would have a value in the range $\frac{1}{2} \leq \sqrt{y} < 1$, and so $d_1 = 0.1 \, b_2 b_3 \ldots b_{17}$ is the first root digit value generated, and $d_2 = \pm 0.000000\,000000\,00000 b_{18} b_{19} b_{20} \ldots b_{34}$ is the second root digit value generated.

The method proceeds to step 16, where the remainder register z is updated for the calculation of the next root digit value. The new z register value is equal to the difference between the current remainder obtained from the z register and the product of the new root digit value and a quantity equal to the sum of twice the partial root and the new root digit value.

The method proceeds to step 18 where the new partial root is accumulated for $i = 1, 2, 3, 4$. In this manner, as each root digit value is determined, the initially zero partial root D is accumulated to 17 more bits of precision and stored.

The method then returns to step 14 where the next root digit value is generated by taking the product of one-half the new remainder and the short reciprocal, conditionally adding the digit bias adjustment factor, and truncating. In this manner, the root digit values are generated in series along with intermediate partial roots and exact remainders. At the end of the process, the exact remainder of a full precision partial root is available for further processing. Although the partial root and remainder pair is not unique at this point due to the fact that the remainder may be either positive or negative, precise rounding can be performed at this point by suitable conditional rounding logic. According to the embodiment disclosed herein, a correction step is performed to obviate the need for conditional rounding logic.

Using the $19 \times 69$ bit rectangular multiplier of one embodiment of the present invention, the square root process requires the generation of four root digit values to complete a full precision square root function. Each root digit requires a combined multiplication and addition step and a combined multiplication and subtraction step corresponding to step 14 and step 16, respectively.

Figure 3:
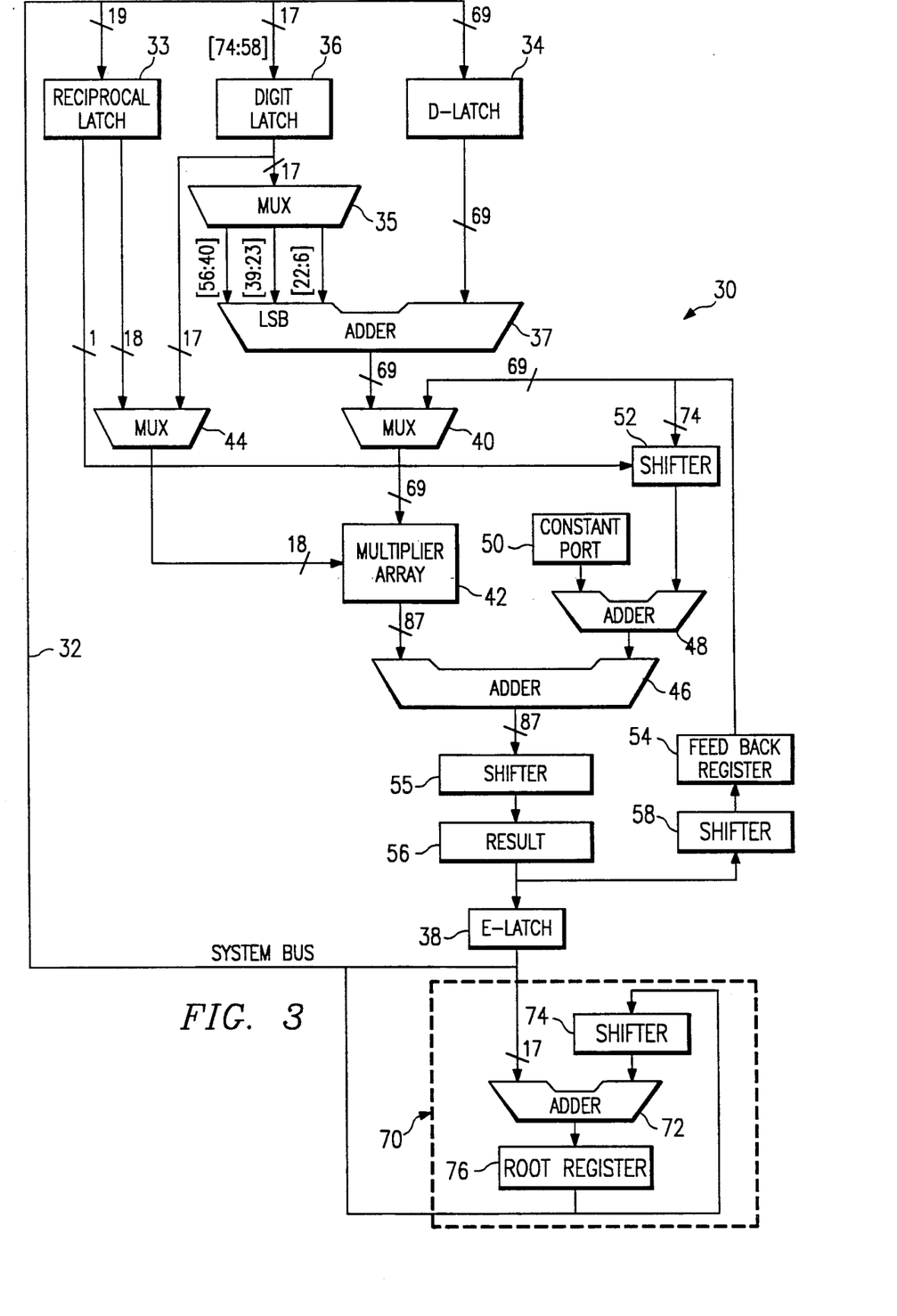
FIG. 3 is a block diagram of the arithmetic system of the present invention.

An important technical advantage of the rectangular multiplier of the present invention, which will be discussed in more detail with reference to FIG. 3, is that the multiplier also comprises an additional adder port. The additional adder port makes it possible to perform certain multiplication and addition steps in one pass through the rectangular multiplier. Accordingly, the operation shown in step 16 which compromises a $17 \times 69$ bit product and a difference, as well as the operations shown in step 14 which comprise certain $19 \times 69$ or certain $20 \times 69$ bit products with addition of a predetermined constant, can each be accomplished in a single pass through the rectangular multiplier.

The partial root and remainder pair may be made unique by passing the partial root and the remainder through a correction sequence illustrated by step 20 in FIG. 1. Because of steps taken in the estimation of the reciprocal in step 12, the correction sequence itself is fairly simple. In this embodiment, the final remainder must be less than a positive quantity equal to the product of $2^{-68}$ and twice the final partial root plus unity in the last place, and greater than a negative quantity equal to the product of $-2^{-68}$ and twice the final partial root minus unity in the last place. If the remainder is negative, the recalculation of the remainder comprises adding an appropriately shifted quantity equal to twice the final partial root minus one unit in the last place to the remainder. The final partial root is then decremented by one unit in the last place. This simple correction sequence is possible because the approximation of the reciprocal generated in step 12 is generated in a manner such that the short reciprocal, when multiplied by the remainder, will generate root digit values which are always either the exact truncated value for the root digit value or one unit too large in the last place of the root digit value as truncated. Because the approximation is carefully limited to these two possible results, the exact square root function is carried out since the resulting partial root and remainder of any square root operation is such that the simple correction sequence described above yields a unique full precision partial root with non-negative remainder. Note, that it is a convenience of this teaching to assume that a non-zero remainder must be forced to a positive value to produce a unique root. A unique root may also be produced by consistently forcing a negative remainder. Either unique partial root and remainder pair may be considered the result of the exact square root function.

Figure 2:
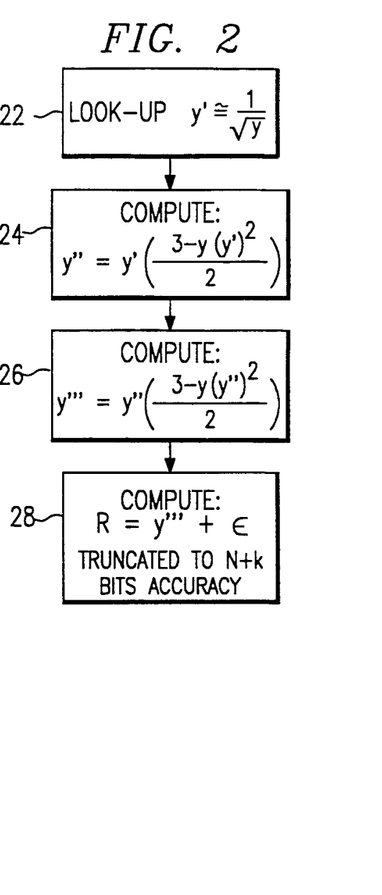
FIG. 2 is a flow chart illustrating a variation of the Newton-Raphson estimation technique used to approximate the reciprocal of the root to be used in the square root system of the present invention.

A novel version of the Newton-Raphson estimation technique used to calculate the aforementioned short reciprocal value is shown in flow chart form in FIG. 2. The method begins at step 22, where a look-up table is used to find a reciprocal seed value y' approximately equal to the reciprocal of the square root of the operand y. It should be understood that the method presupposes that the reciprocal seed value y' is normalized into typical floating point format such that y' is greater than or equal to one and less than two, and y' has a number of bits less than or equal to the smaller dimension of the rectangular aspect ratio multiplier. As discussed previously, the look-up table can only achieve a small number of bits due to the limits in the size of the table. y' is thus used as a seed value and the number of accurate bits in the approximation is increased through an iterative process. In the present embodiment, the seed value, y', is chosen to be of sufficient accuracy to produce an approximate reciprocal with absolute error less than $2^{-22}$ before addition of the reciprocal bias adjustment factor.

The method proceeds to step 24 where the first step of the iterative process is used to compute y". y" is computed by computing a first result as the product of y and y'. The first result is truncated to 69 bits and multiplied by y'/2 and subtracted from 3/2 to form a second result. The second result is truncated to 69 bits and multiplied by y' to form a third result. The third result is truncated to 69 bits to obtain the value for y". The method then proceeds to step 26 where the computation of an approximate reciprocal value, y''', is similarly calculated through an additional iteration of the Newton-Raphson approximation equation as shown, employing for y" the previously computed value of y" truncated to 17 bits for utilization in the shorter side of the multiplier. It should be understood that y' or y" could be used as the approximate reciprocal value if a different size multiplier were used in a different embodiment of the present invention requiring a smaller number of accurate bits in the short reciprocal R. The method concludes at step 28 where the final value of the short reciprocal is achieved by adding the value of the approximate reciprocal value, y''', to a reciprocal bias adjustment factor, epsilon and appropriately truncating the result. Epsilon is a statically generated quantity dependent upon the radix of the root digit values. Epsilon is equal to the sum of two terms. The first term is equal to $2^{-(N+k-1)}$ where, as discussed previously N is equal to the number of bits of the radix of the root digit values and k is a predetermined number of guard bits. The second term is determined large enough to bias the result of the Newton-Raphson approximation to be larger than the true reciprocal. However, the second term must also be sufficiently small such that the determination of a root digit value in 14 will yield a remainder corresponding to less than one unit in the last place of the root digit value determined. For an embodiment of the present invention using a multiplier array having an aspect ratio of $19 \times 69$ bits, epsilon is equal to seventeen-sixty-fourths of a unit in the Nth place of the approximate reciprocal which, in the present embodiment with $N=17$, $k=2$, and $1 \leq y''' < 2$, is equal to $2^{-18} + 2^{-22}$. The short reciprocal R obtained by truncation is either a nineteen bit value in the range $1 < R < 2$, or a twenty bit value given by $R = 10.00\ldots 0b_{18}$ which can then be used in the method illustrated in FIG. 1 to yield a partial root and remainder which is capable of yielding a unique exact result through the simple correction technique discussed above with reference to step 20 of FIG. 1.

Each iteration of the Newton-Raphson equation may require only three passes through a rectangular aspect ratio multiplier if the multiplier includes an additional adder port. The first pass forms the product $y \cdot y'$. The second step forms the product and difference $(3/2) - (y'/2) \cdot (y \cdot y')$. The third pass completes the iteration by forming $y' \cdot \{(3/2) - (y'/2) \cdot (y \cdot y')\}$. As discussed previously, because of the inclusion of an additional adder port, the second term, $(3/2) - (y'/2) \cdot (y \cdot y')$ may be calculated in a single pass through the rectangular multiplier. The results of these successive multiplies may each be truncated to the length of the long side of the rectangular multiplier as only an approximation of the reciprocal accurate to error less than one part in $2^{23}$ is required.

It should be understood that the method of performing the square root function of the present invention does not depend upon the particular method used to calculate the short reciprocal R. The above described variation of the Newton-Raphson process is merely one possible method of generating this value. For example, a version of the Newton-Raphson approximation technique using a single iteration or more than two iterations to generate the approximate reciprocal value would be appropriate in a system using a multiplier which required a short reciprocal having less or more bits of accuracy, respectively, than the embodiment described herein. Further, if an embodiment of the present invention required an even smaller number of accurate bits in the short reciprocal, a direct table look-up of either the approximate reciprocal value prior to the addition of the reciprocal bias adjustment factor or a direct table look-up of the short reciprocal already containing the bias adjustment factor would be practical. The method described with reference to FIG. 2 is described for the purpose of teaching the present invention and should not be construed to limit the scope of the invention to this or any particular method of generating the short reciprocal R.

FIG. 3 is a block diagram of one circuit embodiment capable of performing the method of performing the square root function of the present invention. Referring to FIG. 3, a circuit, indicated generally at 30, uses a system bus 32 for communication between a microprocessor [not shown] and an arithmetic coprocessor comprising circuit 30. System bus 32 may include, for example, the data lines, address lines and control lines from the microprocessor. Coupled to the system bus 32 are a D latch 34, a digit latch 36, a reciprocal latch 33 and an E latch 38. Generally, the D latch 34, the reciprocal latch 33 and the digit latch 36 receive operands from the microprocessor and store the operands to be used in an arithmetic operation and the E latch 38 serves to store the output of the operation.

The reciprocal latch 33 receives nineteen bits from the system bus 32 and outputs the eighteen low order bits to a multiplexer 44. The leading bit is output to a shifter 52 which is coupled between the feedback register 54 and the input to the adder 48. The digit latch 36 receives seventeen bits from the system bus 32 and outputs the seventeen bits to the multiplexer 44 and to a multiplexer 35. The output of multiplexer 35 is coupled through three separate data paths to an adder 37. The D latch 34 receives sixty-nine bits from the system bus 32 and outputs the sixty-nine bits to the adder 37. The output of the adder 37 is input into a multiplexer 40.

Actions relevant to the signs of the quantities involved are assumed to be handled either by the background control or by taking all bits to be signed bits of a redundant binary implementation.

The multiplexer 35 is operable to input a digit stored in digit latch 36 into the adder 37 such that the digit may be appropriately aligned into three separate groups of bit positions. The remaining input to multiplexer 40 is coupled to the output of the feedback register 54 and the output of the multiplexer 40 is input into the long side of the multiplier array 42.

Multiplier array 42 comprises a tree of adder arrays. In order to complete a single short-by-long multiplication using the arithmetic circuit 30, the multiplicand is loaded into the D latch 34, and the multiplier is loaded into the digit latch 36 or reciprocal latch. The mutiplier comprises the "short" operand comprising 18 bits. The multiplicand comprises the "long" operand comprising 69 bits. The multiplicand passes through first multiplexer 40 and is input into the multiplier array 42. The 18 bits of the multiplier are input from the second multiplexer 44 into the short side of the multiplier array 42. The output of the multiplier array is 87 bits wide and forms one input into a first adder 46. To extend the short-by-long multiplication beyond this 18 bit width, the second port of first adder 46 serves as the additional adder port of the multiplier which was described previously. The second port of first adder 46 is coupled to the output of a second adder 48 which has at its inputs a constant port 50 and the output of the feedback register 54. Sixty-nine bits of the output of the feedback register 54 are also coupled to a second input port of the first multiplexer 40, thereby permitting an $18 \times 69$ bit product of feedback register 54 with second multiplexer 44 to be conditionally summed again with the contents of feedback register 54 which is passed through shifter 52 yielding a $19 \times 69$ bit total product at the output of first adder 46.

When the square root of the operand is equal to or near one half, the short reciprocal will be equal to or slightly greater than two. This causes the 19 bit short reciprocal to overflow in our normalization leaving a 0 in the most significant bit position. This condition is detected by examining the most significant bit, and causes shifter 52 to shift left by one which has the effect of adding in twice the contents of the feedback register 54 to properly handle these particular $20 \times 69$ bit multiplies.

An important technical advantage of the adder 46 is its ability to detect overflow and saturate the resulting sum. During the computation of the root digit values, the product of a short reciprocal and a remainder could create overflow indicating a digit with magnitude greater than $2^{17} - 1$. Therefore, the saturation feature of adder 46 is operable to provide a maximum sum corresponding to a 1 on all 86 output bits to the right of the implied binary radix point of adder 46, corresponding to a digit magnitude of $2^{17} - 1$.

The output of the first adder 46 is coupled to the input of a first shifter 55. First shifter 55 operates to shift the output of first adder 46 to the right or left by one place. This shifting is used to keep the maximum number of significant data bits flowing in the data path and for alignment to multiply by one half the remainder as was discussed with reference to step 14 of FIG. 1.

The output of first shifter 55 is input into a result register 56. The output of the result register 56 is fed into two separate locations. The output is first fed into a second shifter 58 which is coupled between the result register 56 and the input to the feedback register 54, from which it may subsequently be returned to multiplier array 42 or adders 48 or 46 for other computations. Shifter 58 is used to shift values in the data path to the left by 17 bits. Shifter 58 is used to once again maintain as many significant data bits as possible in the data path by shifting out bits whose value is known. Because of the features of the method of the present invention, the initial 17 bits of the result of the subtraction step generating the succeeding remainder are always 0. This is due to the fact that the initial bits of the operands of this subtraction step always cancel. These 0 bits are therefore shifted out to the left to allow for 17 additional significant data bits to remain in the data path.

The output of the result register 56 is input into the E latch 38 which as described previously, is coupled to the system bus 32. The system bus 32 is also coupled to an accumulator circuit, indicated generally at 70. Accumulator 70 comprises an adder 72 which has one of its ports coupled to the system bus 32. The remaining port of adder 72 is coupled to a shifter 74. The output of adder 72 is input into a root register 76 which is also coupled to the input of shifter 74. The output of the root register 76 is also coupled to the system bus 32. This connection supplies a data path by which the partial root may return to the D latch 34 for the calculation of the succeeding remainder as was discussed with reference to step 16 shown in FIG. 1.

As described previously, the basic operation used to perform the novel square root method of the present invention is the multiplication operation. It is important to distinguish between different types of multiplication operations, however. Prior art methods of performing the square root function calculated a full length, full precision approximation of the reciprocal of the root and then performed a full precision, "long-by-long" multiplication. An additional full precision multiplication was then used to correct the result. The square root method of the present invention does not require any full precision multiplications. The multiplication operations necessary for the present method are much simpler and quicker "short-by-long" multiplications.

The method of performing the exact square root function of the present invention is perhaps best understood when examined in conjunction with the conventional long hand square root method. The two methods are most easily compared if examples are used which calculate the square roots in the more familiar base 10.

Figure 4A:
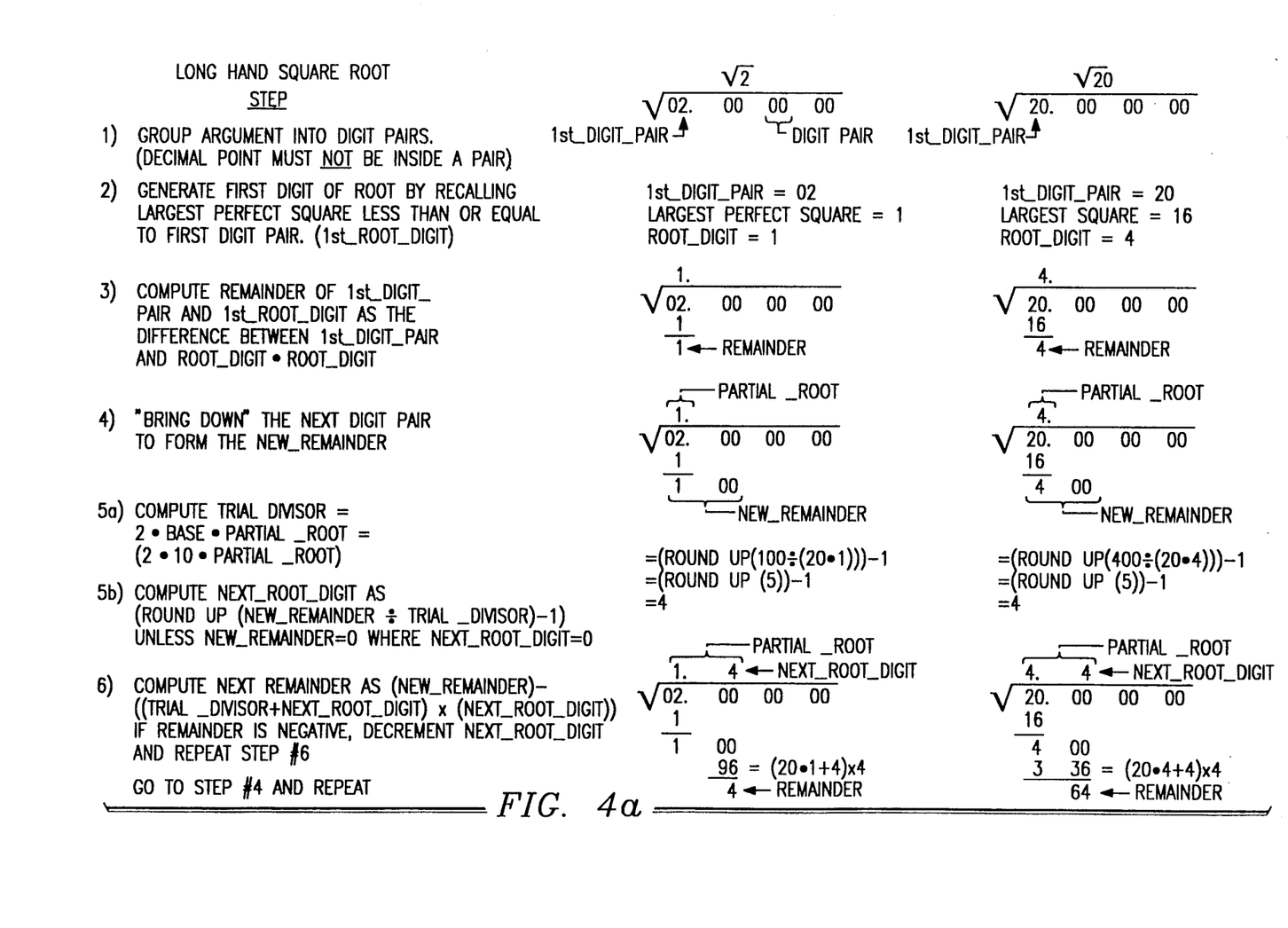
FIGS. 4a–4c are examples of the conventional square root method using base 10 numbers.
Figure 4B:
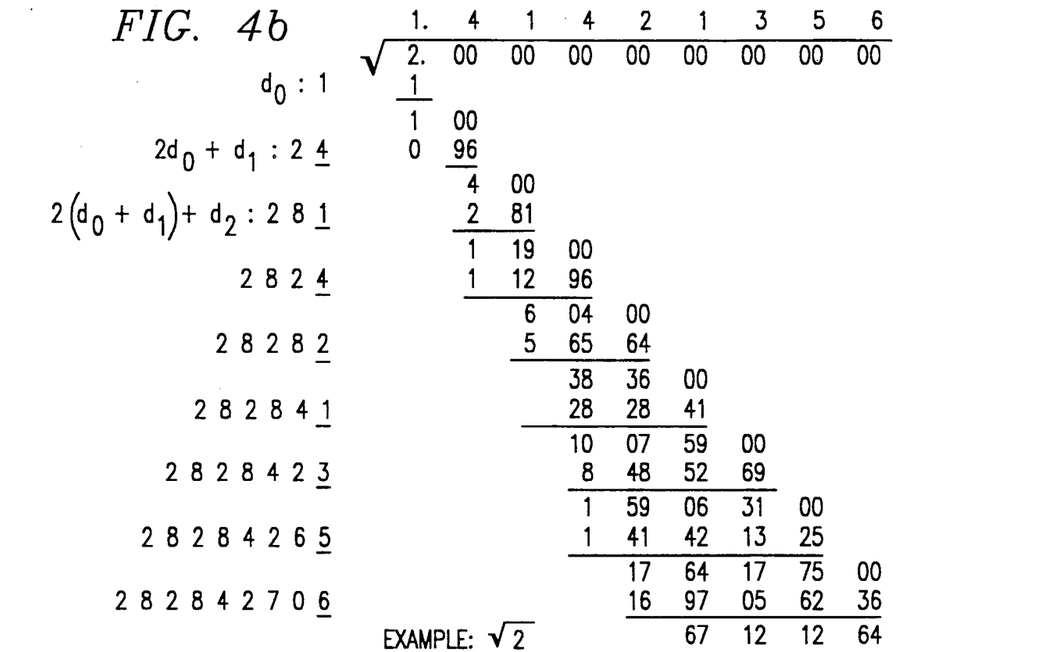
Figure 4C:
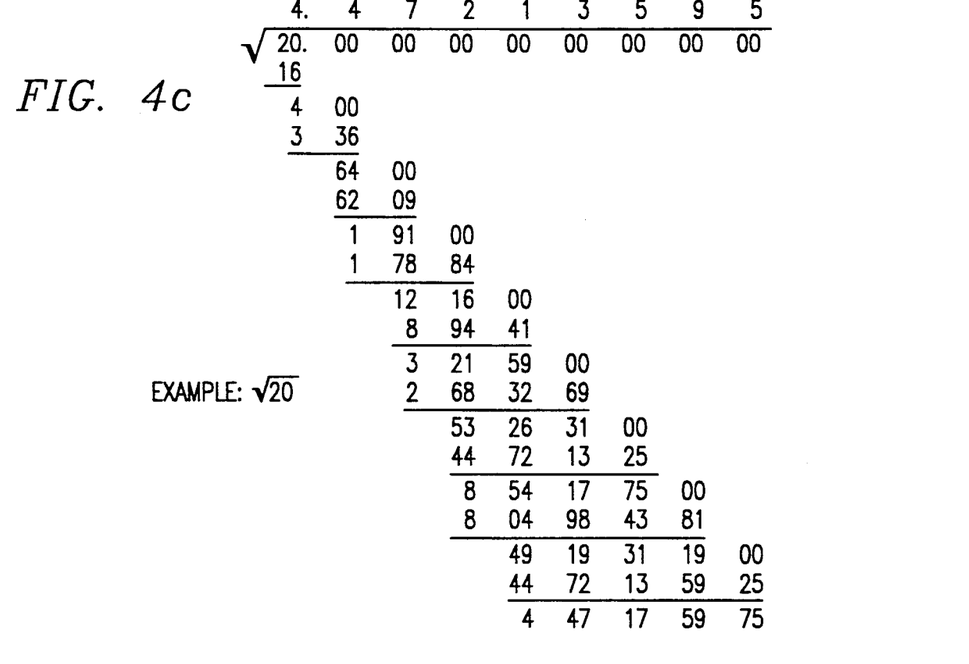

FIG. 4a illustrates in tabular form the steps required to perform the conventional long hand square root method. FIG. 4b illustrates the long hand method used to calculate the square root of two, and FIG. 4c illustrates the long hand method used to calculate the square root of 20. Both examples are calculated in base 10.

Referring to FIG. 4a, step 1 entails grouping the arguments into digit pairs. It is important to note at this point that the decimal point must not be within a pair of digits. It is important to realize that the exponent of the argument must be respected. This can be seen in the following example in that the square root of two does not contain the same significant digits as the square root of 20. In step 2, the first digit of the root is generated by recalling the largest perfect square less than or equal to the first digit pair and using the root of this perfect square as the first digit. In the example shown, the largest perfect square less than or equal to two is one, and therefore the first root digit of the square root of two is one. The largest perfect square which is less than 20 is 16, and therefore, the first digit of the root of 20 is four.

In step 3, the remainder is computed as the difference between the first digit pair and the first root digit squared. In step 4, the next digit pair is brought down to form the new remainder. It is a feature of the long hand square root method that both the remainder and new remainder are defined by these limited number of digits with subsequent digits of the original operand brought into the computation at the rate of one new digit pair per cycle. In the square root of two example, the new remainder is 100, and in the square root of 20 example, the new remainder is 400 as shown. In step 5a, a trial divisor is computed equal to two times the base times the partial root. In the square root of two example, the first trial divisor is equal to 20. In the square root of 20 example, the first trial divisor is equal to 80.

In step 5b, the next root digit is computed by dividing the new non zero remainder by the trial divisor, rounding up the quotient and subtracting one. If the new remainder is zero, the next root digit is set to zero. In both the square root of two and square root of 20 examples, the next root digit is computed to be four yielding partial roots of 1.4 for 2 and 4.4 for 20 as shown. In step 6, the next remainder is computed. The next remainder is equal to the product of the next root digit, and the sum of the trial divisor and the next root digit. In the square root of two example, the next remainder is computed to be equal to four. In the square root of 20 example, the next remainder is computed to be 64. At this point the next remainder may be negative. It is a feature of the long hand square root that the computation of step 5b does not always identify the appropriate next digit. In this case the current estimate of the next digit is decremented by one and step 6 repeated.

The method then returns to step 4 where the next digit pair is brought down to form the new remainder. The long hand method can then proceed indefinitely to generate as many digits of the square root as are desired. It can be seen from the examples illustrated in FIG. 4a that the conventional long hand square root method requires a large number of complex arithmetic operations to generate each digit of the root. The iterative steps required for the generation of each root digit occupy an arithmetic processor's time with at least one multiplication operation, one division operation and a number of additional shifting and adding operations.

In FIG. 4b, the conventional long hand square root method is used to calculate the square root of two. In the left hand column, the summation of twice the previous digits plus the last digit to be calculated (underlined) is shown. This term with the yet to be determined last digit (underlined) taken as zero constitutes the trial divisor which was discussed with reference to step 5 in FIG. 4a. The fact that the division in step 5b must be performed before the last digit can be added to the trial divisor, explains why a negative remainder may occur in step 6 and force decrementation of the root digit and recomputation of step 6.

FIG. 4c illustrates the conventional long hand square root method used to calculate the square root of 20 to a partial root with nine digits of accuracy with positive remainder.

Figure 5:
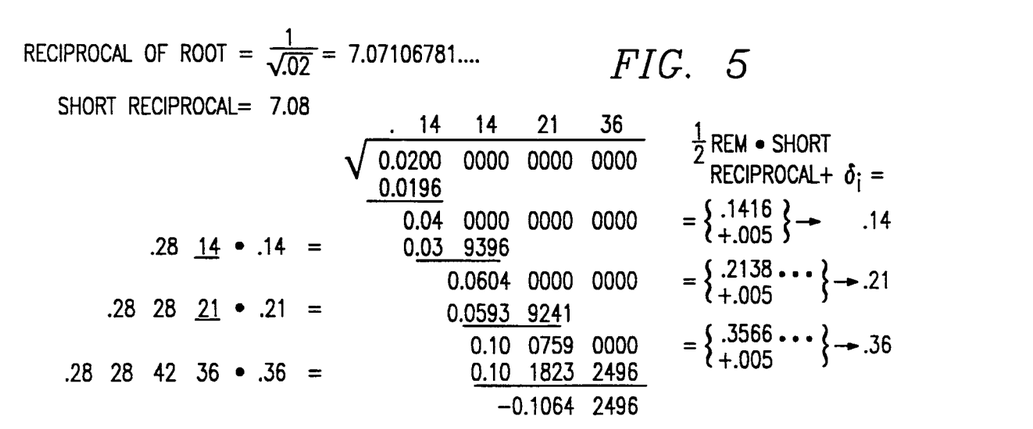
FIG. 5 is an example of the square root method of the present invention using base 10 numbers.

A base 10 example of the method of performing the exact square root function according to the present invention is illustrated in FIG. 5. FIG. 5 shows the computation of the square root of 0.02 using the method illustrated by the flowchart shown in FIG. 1. The example shown in FIG. 5 uses large radix digits of base 100. The large radix digits of the operand are themselves grouped into digit pairs, each group then having four decimal places. Initially, the reciprocal of the square root of two is approximated to be equal to 7.08. This corresponds to the calculation of the short reciprocal discussed previously. The initial digit of the root is calculated by multiplying 7.08 times the operand 0.02 yielding 0.1416, then the small digit bias adjustment factor is added and truncation yields 0.14 as the first root digit value. This first root digit value is squared and subtracted from the initial operand to yield the new remainder 0.0004. The successive remainders in FIG. 5 are shown with a radix point corresponding to two more leading zeroes deleted each cycle to illustrate how remainders appear when shifted left in the z register to maintain more digits in the data path as discussed with reference to shifter 58 in FIG. 3. One-half this remainder is then multiplied by the short reciprocal, the digit bias adjustment factor is added with truncation then yielding the next root digit value equal to 0.0014. This root digit value is then added to twice the previous partial root to yield the sum 0.2814. The root digit value, 0.0014, is then multiplied times the sum, 0.2814, to yield 0.0003 9396. This product is then subtracted from the previous remainder to yield the next remainder equal to 0.00000604. This process continues for the generation of the last two root digit values equal to 0.000021 and 0.00000036, respectively. The process concludes with the partial root 0.14142136 and corresponding negative remainder $-0.0000\ 0000\ 1064\ 2496$. The negative remainder is made positive by a step not illustrated in FIG. 5 by adding a quantity given by $10^{-8}$ times the sum of twice the partial root minus unity in the last place, yielding the final remainder $0.0000\ 0000\ 1764\ 1775$ corresponding to the decremented final partial root 0.14142135.

The example in FIG. 5 illustrates that through using a single short-by-long multiplication step each, the root digit values are serially generated and the corresponding new exact remainders are determined. The method requires the accumulation of twice the previous partial root plus the new root digit value as a multiplicand. The short reciprocal is calculated such that the remainder following the calculation of each root digit value corresponds in magnitude to less than one unit in the last place of the preceeding root digit value.

The method illustrated by the base 10 example shown in FIG. 5 is directly applicable to the circuit shown in FIG. 3, the only difference being the circuit shown in FIG. 3 utilizes operands in binary signed digit format. Further, the digit length of the root digits generated by the circuit shown in FIG. 3 are seventeen bits long. This corresponds to a radix of $2^{17}=131,072$.

In order to perform the square root method of the present invention using circuit 30, the approximation of the reciprocal is generated as described previously and stored in the reciprocal latch 33. The operand is loaded into the feedback register 54 by passing it unchanged from the system bus 32 through circuit 30. The feedback register 54 thus acts as the z register referred to with respect to FIG. 1.

In order to generate the first root digit value, the operand is selected by multiplexer 40 from the feedback register 54 and is multiplied by the short reciprocal. The 18 low order bits of the short reciprocal are loaded through a multiplexer 44 into the multiplier array 42 with the product input to one port of adder 46. The operand is also fed to shifter 52 to allow multiplication by the leading bit of the short reciprocal generating a result on one input port to adder 48. The other input port of adder 48 receives the digit bias adjustment factor $\delta_1$, from constant port 50. The sum output from adder 48 is added to the product from multiplier 42 in adder 46 outputing the result to shifter 55. The seventeen most significant bits of the result constitutes the first root digit value. The first root digit value is then loaded into the digit latch 36 and the D-LATCH, 34. The root digit value is also loaded through adder 72 into root register 76.

The first remainder is calculated by first squaring the first root digit value. This is accomplished by loading the first root digit value into the long side of the multiply array 42. This load is accomplished by passing the first root digit value from the D-LATCH 34 through adder 37 and multiplexer 40. The multiplexer 35 outputs a zero into the adder 37 so that the first root digit value is unchanged as it passes through adder 37. The first root digit value is also loaded from the digit latch 36 through multiplexer 44 into the short side of the multiplier array 42. The multiplier array 42 then accomplishes the squaring of the first root digit value. The operand is passed from feedback register 54 through second adder 48 into first adder 46 where the square of the first root digit value is subtracted. The difference output by first adder 46 is shifted right one place in shifter 55 and is passed to the result register 56 and constitutes one-half the new remainder which is then shifted to the left 17 bits in third shifter 58. As described previously, the first seventeen bits of the remainder are all zero resulting from the fact that the initial bits of the operands of the subtraction operation cancel. The shifted remainder is then loaded into feedback register 54 to enable the calculation of the next root digit value. The actual quantity loaded in register 54 is equal to one-half the remainder due to its alignment through shifter 55 in preparation for the next root digit value computation in step 14. The result from root register 76 is now passed to the D-LATCH 34 aligned by one bit to provide a quantity equal to twice the partial root to be available to adder 37 for computation of the new remainder on the subsequent iteration of step 16.

Each succeeding root digit value is calculated by multiplying the short reciprocal which is loaded into the multiplier array 42 through multiplexer 44 with the short reciprocal leading bit input to shifter 52 by one-half the remainder which is present in the feedback register 54 and is loaded into shifter 52 and into the long side of multiplier array 42 through multiplexer 40. The digit bias adjustment factors $\delta_2$, $\delta_3$ and $\delta_4$ are input from constant port 50 and conditionally added to the leading part of the product in adder 48 which result is then added to the output of multiplier 42 in adder 46.

Specifically, for the second root digit value computation $\delta_2$ is equal to one-half unit in the last place to which the result will be truncated, and is added to alleviate error introduced as a result of the truncation to seventeen bits. The seventeen most significant bits of either the sum of the product and $\delta_2$, if the product is positive, or merely the seventeen most significant bits of the product, if the product is negative, form the second root digit value. As each digit is generated, it is loaded into the digit latch 36 and into accumulator 70, where it is added to the partial root in adder 72 after the partial root has been shifted to the left seventeen places in shifter 74. The partial root is then loaded into root register 76 but not passed to the D-LATCH 34 at this time as the next remainder computation must use the previous partial root value. The next remainder can thus be calculated by adding the new digit value stored in digit latch 36 to a quantity equal to twice the preceeding partial root available to adder 37 from the D-latch 34. The multiplexer 35 takes care of the alignment of the digits depending on whether it is the second, third or fourth digit calculated. Adder 37 is necessary to accommodate the borrow from the partial root which may result if the digit loaded in digit latch 36 is a negative number.

The quantity $(2D+d_i)$ output from adder 37 is input into the long side of multiplier array 42, and the digit $d_i$ is passed through multiplier 44 into the short side of multiplier array 42. The value of one half the remainder present in feedback register 54 is doubled in shifter 52 yielding the remainder as input into adder 46. Consequently, the product output from the multiplier array 42 can then be subtracted from the remainder in adder 46. In this manner, the new remainder is calculated in a single calculation step because of the inclusion in circuit 30 of an additional adder port embodied in adder 46. For the calculation of the third and fourth root digit values, the value of the digit bias adjustment factors, $\delta_3$ and $\delta_4$, which are added if the current root digit is positive, are also equal to one-half unit in the last place to which the result will be truncated.

These steps are repeated until four root digit values have been accumulated and an exact remainder is available. As discussed previously, the circuit 30 then performs a correction sequence based on the value of the final remainder. If the final remainder is negative, the correction of the remainder indicated in step 20 may be accomplished by passing the final partial root through the adder 37 and multiplier 42 unchanged to adder 46 to be added to the value of one half the remainder obtained through shifter 52 with the subtraction of the unit in the appropriate last position from constant port 50 performed in adder 48 prior to the addition in adder 46. The resulting value equal to one half the final remainder is shifted left one place in shifter 55 to provide the final remainder for output to result register 56. The final partial root after the conditional borrow resides in root register 76 as accumulator circuit 70 comprises the necessary circuitry to conditionally decrement the partial root present in root register 76.

In summary, the present invention provides a method of performing the exact square root which comprises approximating the reciprocal of the root and serially generating large radix root digit values and exact remainders. A reciprocal bias adjustment factor is added to the approximation of the reciprocal and digit bias adjustment factors are added in each positive root digit value computation prior to truncation to insure that any error within a particular root digit value will be limited to less than one unit of error in the last place of the truncated digit. This is to ensure that the error in the digit can be compensated for in the calculation of the remaining root digit values. The particular circuit embodiment described herein uses a rectangular multiplier array having an aspect ratio of 18 bits by 69 bits including an additional adder port. The rectangular multiplier of this circuit is particularly suited to the square root operation of the present invention as the short side of the multiplier array comprises substantially the same number of bits as a single root digit value.

Although the invention has been described in connection with the particular circuit embodiment, it should be understood that the method of performing the exact square root function of the present invention is equally applicable to a large number of multipliers with widely varying aspect ratios using either signed digit or non-redundant format as well as circuits which do not use an array multiplier. The disclosure of the particular circuit described herein is for the purposes of teaching the present invention and should not be construed to limit the scope of the present invention which is solely defined by the scope and spirit of the appended claims.

What is claimed is:

1. A circuit for calculating an exact square root of an operand, comprising:

circuitry for obtaining a short reciprocal of the square root of the operand;

circuitry for computing a first root digit value by multiplying a short reciprocal of the square root of the operand by said operand;

circuitry for computing a first remainder as the difference between said operand and a square of said first root digit value;

circuitry for computing a second root digit value by multiplying said short reciprocal by one half of said first remainder;

circuitry for generating a product of said second root digit value and a sum of said second root digit value and twice said first root digit value;

circuitry for computing a second remainder as the difference between said first remainder and said product of said second root digit value and said sum of said second root digit value and twice said first root digit value, said first and second root digit values and said first and second remainders calculated such that said first remainder and said second remainder have magnitudes corresponding to less than one unit in the last place of said first root digit value and said second root digit value, respectively; and circuitry for computing a partial root, said partial root comprising a sum of all appropriately shifted root digit values.

2. The circuit of claim 1 wherein said circuitry for obtaining said short reciprocal comprises:

circuitry for adding a reciprocal bias adjustment factor to an approximate reciprocal to yield a sum and truncating said sum to yield said short reciprocal, said reciprocal bias adjustment factor chosen to offset accumulated error in the approximate reciprocal and bias said short reciprocal to produce root digit values which, when accumulated to form a partial root, are always at most one unit in the last place greater than or exactly equal to an exact value of the square root truncated to a predetermined number of bits.

3. The circuit of claim 1 wherein said circuitry for computing a first root digit value comprises:

circuitry for selectively adding a digit bias adjustment factor to a product of said short reciprocal and said operand if said product is positive; and circuitry for truncating said product to a predetermined number of bits to generate said root digit value, said digit bias adjustment factor operable to offset error introduced by said truncation.

4. The circuit of claim 1 wherein said first root digit value gives rise to a negative first remainder when said first root digit value is greater than an exact value of the square root truncated to a predetermined number of bits, said negative remainder causing said second root digit value to be negative, thereby causing said partial root to have a value less than the value of said first root digit value.

5. The circuit of claim 1 wherein said circuitry for computing a partial root comprises circuitry for calculating a sum of the appropriately shifted root digit values, said sum forming a partial root of a partial root and remainder pair, said pair composing the exact square root of the operand.

6. The circuit of claim 1 wherein said circuitry for obtaining said short reciprocal comprises:
look-up table circuitry for storing a plurality of reciprocal seed values;
retrieval circuitry coupled to said look-up table circuitry for retrieving a particular reciprocal seed value approximately equal to the reciprocal of the square root of the operand;
circuitry for computing a first reciprocal approximation equal to the product of said particular reciprocal seed value and the difference of three-halves and a second term, said second term being the product of said particular seed value and a third term, said third term being the product of one-half of said operand and said particular reciprocal seed value; and
circuitry for computing a second reciprocal approximation equal to the product of said first reciprocal approximation and the difference of three halves and a fourth term, said fourth term being the product of said first reciprocal approximation and a fifth term, said fifth term being the product of one-half of the operand and said first reciprocal approximation.

7. The circuit of claim 6 wherein said circuitry for obtaining said short reciprocal further comprises:
circuitry for computing said short reciprocal equal to the truncated sum of a prior reciprocal approximation and a reciprocal bias adjustment factor chosen to offset accumulated error in said prior reciprocal approximation and bias said short reciprocal to produce root digit values which, when accumulated to form a partial root, yield a partial root at most one unit in the last place greater than or exactly equal to the exact value of the square root truncated to a predetermined number of bits.

8. The circuit of claim 7 wherein said prior reciprocal approximation is equal to said second reciprocal approximation.

9. The circuit of claim 7 wherein said reciprocal bias adjustment factor is equal to the sum of a first and a second term, said first term equal to $2^{-k}$ in the Nth place where N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first and second remainders correspond to less than one unit in the last place of said first and second root digit values, respectively.

10. The circuit of claim 9 wherein said reciprocal bias adjustment factor is equal to the sum of a first term being ¼ of a unit in the Nth place and a second term being 1/64 of a unit in the Nth place.

11. The circuit of claim 1 wherein said circuitry for obtaining said short reciprocal comprises:
look-up table circuitry for storing a plurality of approximate reciprocal values;
retrieval circuitry coupled to said look-up table circuitry for retrieving a particular approximate reciprocal value approximately equal to the reciprocal of the square root of the operand.

12. The circuit of claim 11 wherein said circuitry for obtaining said short reciprocal further comprises:
circuitry for adding a reciprocal bias adjustment factor to said particular approximate reciprocal value to yield a sum and truncating said sum to yield said short reciprocal, said reciprocal bias adjustment factor chosen to offset error in the approximate reciprocal value and bias said short reciprocal to produce root digit values which, when accumulated to form a partial root, yield a partial root at most one unit in the last place greater than or exactly equal to the exact value of the square root truncated to a predetermined number of bits.

13. The circuit of claim 11 wherein said reciprocal bias adjustment factor is equal to the sum of a first and a second term, said first term equal to $2^{-k}$ in the Nth place where N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first and second remainders correspond to less than one unit in the last place of said first and second root digit values, respectively.

14. The circuit of claim 13 wherein said reciprocal bias adjustment factor is equal to the sum of a first term being ¼ of a unit in the Nth place and a second term being 1/64 of a unit in the Nth place.

15. The circuit of claim 1 wherein said circuitry for obtaining said short reciprocal comprises:
look-up table circuitry for storing a plurality of short reciprocal values; and
retrieval circuitry coupled to said look-up table circuitry for retrieving a particular short reciprocal value approximately equal to the reciprocal of the square root of the operand said particular short reciprocal value comprising the truncated sum of an approximate reciprocal value of the square root of the operand and a reciprocal bias adjustment factor chosen to offset error in said approximate reciprocal value and bias said short reciprocal value to produce root digit values which, when accumulated to form a partial root, yield a partial root at most one unit in the last place greater than or exactly equal to the exact value of the square root of the operand truncated to a predetermined number of bits.

16. The circuit of claim 15 wherein said reciprocal bias adjustment factor is equal to the sum of a first and a second term, said first term equal to $2^{-k}$ in the Nth place were N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first and second remainders correspond to less than one unit in the last place of said first and second root digit values, respectively.

17. The circuit of claim 16 wherein said reciprocal bias adjustment factor is equal to the sum of a first term being ¼ of a unit in the Nth place and a second term being 1/64 of a unit in the Nth place.

18. The circuit of claim 1, wherein said circuitry for obtaining said short reciprocal comprises:
look-up table circuitry for storing a plurality of reciprocal seed values;
retrieval circuitry for retrieving a particular reciprocal seed value associated with the operand;
circuitry for computing an approximate reciprocal value equal to the product of said particular reciprocal seed value and the difference of three-halves and a second term, said second term being the product of said particular reciprocal seed value and a third term, said third term being the product of one-half of said operand and said particular reciprocal seed value.

19. The circuit of claim 18 wherein said circuitry for obtaining said short reciprocal further comprises:
circuitry for adding a reciprocal bias adjustment factor to said approximate reciprocal value to yield a sum and truncating said sum to yield said short reciprocal, said reciprocal bias adjustment factor chosen to offset error in said approximate reciprocal value and bias said short reciprocal to produce root digit values which, when accumulated to form a partial root, yield a partial root at most one unit in the last place greater than or exactly equal to the exact value of the square root truncated to a predetermined number of bits.

20. The circuit of claim 19 wherein said reciprocal bias adjustment factor is equal to the sum of a first and a second term, said first term equal to $2^{-k}$ in the Nth place where N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first and second remainders correspond to less than one unit in the last place of said first and second root digit values, respectively.

21. The circuit of claim 20 wherein said reciprocal bias adjustment factor is equal to the sum of a first term being ¼ of a unit in the Nth place and a second term being 1/64 of a unit in the Nth place.

22. The circuit of claim 1 wherein said circuitry for obtaining said short reciprocal comprises:
circuitry for obtaining an approximate reciprocal value approximately equal to the reciprocal of the square root of the operand; and
circuitry for adding a reciprocal bias adjustment factor to said approximate reciprocal value to yield a sum and truncating said sum to yield said short reciprocal, said reciprocal bias adjustment factor chosen to offset error in said approximate reciprocal value and bias said short reciprocal to produce root digit values which, when accumulated to form a partial root, yield a partial root at most one unit in the last place greater than or exactly equal to the exact value of the square root truncated to a predetermined number of bits.

23. The circuit of claim 22 wherein said reciprocal bias adjustment factor is equal to the sum of a first and a second term, said first term equal to $2^{-k}$ in the Nth place where N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first and second remainders correspond to less than one unit in the last place of said first and second root digit values, respectively.

24. The circuit of claim 23 wherein said reciprocal bias adjustment factor is equal to the sum of a first term being ¼ of a unit in the Nth place and a second term being 1/64 of a unit in the Nth place.

25. The circuit of claim 1 and further comprising:
circuitry for decrementing a final partial root generated by one unit in the last place if a final remainder generated is negative.

26. The circuit of claim 25 and further comprising:
circuitry for correcting said final remainder by adding twice the decremented final partial root plus one unit in the last place of the last root digit to said final remainder if said final remainder is negative.

27. A circuit for calculating an exact square root of an operand, comprising:
a rectangular array multiplier;
circuitry coupled to said multiplier for obtaining a short reciprocal of the square root of the operand;
circuitry coupled to said multiplier for facilitating the multiplication of said short reciprocal by said operand to yield a first product;
circuitry for adding a first digit bias adjustment factor and truncating said first product to have less bits than said operand to yield a first root digit value;
circuitry, including said multiplier, for generating a square of said first root digit value;
circuitry for computing a difference between the operand and said square of said first root digit value to yield a first remainder;
circuitry coupled to said multiplier for facilitating the multiplication of said short reciprocal by one half of said first remainder to yield a second product;
circuitry for adding a second digit bias adjustment factor and truncating said second product to have less bits than the operand to yield a second root digit value;
circuitry for computing a first partial root as the sum of the appropriately shifted first and second root digit values;
circuitry, including said multiplier, for generating a product of said second root digit value and the sum of said second root digit value and twice said first root digit value; and
circuitry for computing the difference between said first remainder and said product of said second root digit value and the sum of said second root digit value and twice said first root digit value to yield a second remainder;
circuitry coupled to said multiplier for facilitating the multiplication of said short reciprocal by one half of said second remainder to yield a third product;
circuitry for truncating said third product to have less bits than the operand to yield a third root digit value;

circuitry for computing a second partial root as the sum of the appropriately shifted first, second and third root digit values;

circuitry, including said multiplier, for generating a product of said third root digit value and the sum of said third root digit value and twice said first partial root; and circuitry for computing the difference between said second remainder and said product of said third root digit value and the sum of said third root digit value and twice said first partial root to yield a third remainder, said first, second and third root digit values calculated such that said first, second and third remainders have magnitudes corresponding to less than one unit in the last place of said first, second and third root digit values, respectively.

28. The circuit of claim 27 and further comprising:
circuitry coupled to said multiplier for storing said short reciprocal.

29. The circuit of claim 27 wherein said circuitry for obtaining a short reciprocal comprises:
circuitry for adding a reciprocal bias adjustment factor chosen to offset accumulated error in an approximate reciprocal and bias said short reciprocal to produce root digit values which, when accumulated to form a partial root, yield a partial root at most one unit in the last place greater than or exactly equal to an exact value of the square root truncated to a predetermined number of bits.

30. The circuit of claim 29 wherein said root digit values give rise to a negative remainder when said root digit values are greater than said exact value, said negative remainder causing a succeeding root digit value to be negative, thereby causing a product of said succeeding root digit value and a term comprising the sum of said succeeding root digit value and twice the previous partial root operable to reduce the magnitude of said negative remainder.

31. The circuit of claim 27 wherein said circuitry for obtaining a short reciprocal of the square root of the operand, comprises:
look-up table circuitry for storing a plurality of reciprocal seed values;
retrieval circuitry coupled to said look-up table circuitry for retrieving a particular reciprocal seed value approximately equal to the reciprocal of the operand;
circuitry for computing a first reciprocal approximation equal to the product of said particular reciprocal seed value and the difference of three-halves and a second term, said second term being the product of said particular reciprocal seed value and a third term, said third term being the product of one-half of said operand and said particular reciprocal seed value; and
circuitry for computing a second reciprocal approximation equal to the product of said first reciprocal approximation and the difference of three-halves and a fourth term, said fourth term being the product of said first reciprocal approximation and a fifth term, said fifth term being the product of one-half of said operand and said first reciprocal approximation.

32. The circuit of claim 31, wherein said circuitry for obtaining a short reciprocal of the square root of the operand further comprises:
circuitry associated with said multiplier for computing said short reciprocal equal to the truncated sum of a prior reciprocal approximation and a reciprocal bias adjustment factor chosen to offset accumulated error in said prior reciprocal approximation and bias said short reciprocal to produce root digit values which, when accumulated to form a partial root, yield a partial root at most one unit in the last place greater than or exactly equal to the exact value of the square root truncated to a predetermined number of bits.

33. The circuit of claim 32 wherein said prior reciprocal approximation is equal to the said second reciprocal approximation.

34. The circuit of claim 32 wherein said reciprocal bias adjustment factor is equal to the sum of a first and a second term, said first term equal to $2^{-k}$ in the Nth place where N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first, second and third remainders correspond to less than one unit in the last place of said first, second and third root digit values.

35. The circuit of claim 32 wherein said reciprocal bias adjustment factor is equal to the sum of a first term being ¼ of a unit in the Nth place and a second term being 1/64 of a unit in the Nth place.

36. The circuit of claim 27 and further comprising:
circuitry for decrementing a final partial root digit value generated by one unit in the last place if a final remainder generated is negative.

37. The circuit of claim 36 and further comprising:
circuitry for correcting said final remainder by adding twice the decremented final partial root plus one unit in the last place of the last root digit to said final remainder if said final remainder is negative.

38. The circuit of claim 27 wherein said circuitry for obtaining a short reciprocal comprises:
look-up table circuitry for storing a plurality of approximate reciprocal values;
retrieval circuitry coupled to said look-up table circuitry for retrieving a particular approximate reciprocal value approximately equal to a reciprocal of the square root of the operand.

39. The circuit of claim 38 wherein said circuitry for obtaining a short reciprocal further comprises:
circuitry for adding a reciprocal bias adjustment factor to said particular approximate reciprocal value to yield a sum and truncating said sum to yield said short reciprocal, said reciprocal bias adjustment factor chosen to offset error in said particular approximate reciprocal value and bias said short reciprocal to produce root digit values which, when accumulated to form a partial root, yield a partial root at most one unit in the last place greater than or exactly equal to the exact value of the square root truncated to a predetermined number of bits.

40. The circuit of claim 40 wherein said reciprocal bias adjustment factor is equal to the sum of a first and a second term, said first term equal to $2^{-k}$ in the Nth place where N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first, second and third remainders correspond to less than one unit in the last place of said first, second and third root digit values.

41. The circuit of claim 39 wherein said reciprocal bias adjustment factor is equal to the sum of a first term being ¼ of a unit in the Nth place and a second term being 1/64 of a unit in the Nth place.

42. The circuit of claim 27 wherein said circuitry for obtaining a short reciprocal comprises:
look-up table circuitry for storing a plurality of short reciprocal values, each of said short reciprocal values comprising the truncated sum of an approximate reciprocal value and a reciprocal bias adjustment factor chosen to offset error in said approximate reciprocal value and bias said short reciprocal value to produce root digit values which, when accumulated to form a partial root, yield a partial root at most one unit in the last place greater than or exactly equal to the exact value of the square root truncated to a predetermined number of bits; and
retrieval circuitry coupled to said look-up table circuitry for retrieving a particular short reciprocal value approximately equal to a reciprocal of the square root of the operand.

43. The circuit of claim 41 wherein said reciprocal bias adjustment factor is equal to the sum of a first and a second term, said first term equal to $2^{-k}$ in the Nth place where N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first, second and third remainders correspond to less than one unit in the last place of said first, second and third root digit values.

44. The circuit of claim 42 wherein said reciprocal bias adjustment factor is equal to the sum of a first term being ¼ of a unit in the Nth place and a second term being 1/64 of a unit in the Nth place.

45. The circuit of claim 27 wherein said circuitry for obtaining a short reciprocal comprises:
look-up table circuitry for storing a plurality of reciprocal seed values;
retrieval circuitry for retrieving a particular reciprocal seed value approximately equal to a reciprocal of the square root of the operand; and
circuitry for computing the product of said particular reciprocal seed value and the difference of three-halves and a second term, said second term being the product of said particular reciprocal seed value and a third term, said third term being the product of one-half of said operand and said particular reciprocal seed value.

46. The circuit of claim 45 wherein said circuitry for obtaining a short reciprocal further comprises:
circuitry for adding a reciprocal bias adjustment factor to said approximate reciprocal value to yield a sum and truncating said sum to yield said short reciprocal, said reciprocal bias adjustment factor chosen to offset error in said approximate reciprocal to produce root digit values which, when accumulated to form a partial root, yield a partial root at most one unit in the last place greater than or exactly equal to the exact value of the square root truncated to a predetermined number of bits.

47. The circuit of claim 46 wherein said reciprocal bias adjustment factor is equal to the sum of a first a and second term, said first term equal to $2^{-k}$ in the Nth place where N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first, second and third remainders correspond to less than one unit in the last place of said first, second and third root digit values.

48. The circuit of claim 46 wherein said reciprocal bias adjustment factor is equal to the sum of a first term being ¼ of a unit in the Nth place and a second term being 1/64 of a unit in the Nth place.

49. The circuit of claim 46 wherein said reciprocal bias adjustment factor is equal to the sum of a first and a second term, said first term equal to $2^{-k}$ in the Nth place where N is equal to the number of bits of the radix of the root digit values and k is a predetermined number of guard bits, said second term being large enough to bias said short reciprocal such that said short reciprocal is larger than an exact reciprocal of the square root of the operand and said second term being small enough such that said first, second and third remainders correspond to less than one unit in the last place of said first, second and third root digit values.

50. The circuit of claim 27 wherein said circuitry for obtaining a short reciprocal comprises:
circuitry for obtaining an approximate reciprocal value approximately equal to a reciprocal of the square root of the operand; and
circuitry for adding a reciprocal bias adjustment factor to said approximate reciprocal value to yield a sum and truncating said sum to yield said short reciprocal, said reciprocal bias adjustment factor chosen to offset error in said approximate reciprocal value and bias said short reciprocal to produce root digit values which, when accumulated to form a partial root, yield a partial root at most one unit in the last place greater than or exactly equal to the exact value of the square root truncated to a predetermined number of bits.

51. The circuit of claim 50 wherein said reciprocal bias adjustment factor is equal to the sum of a first term being ¼ of a unit in the Nth place and a second term being 1/64 of a unit in the Nth place.

52. A method of calculating an exact square root of an operand, comprising the steps of:
inputting a short reciprocal of the operand into a first input of a multiplier circuit;
inputting a remainder value initially equal to the operand into a second input of the multiplier circuit;
computing a root digit value by multiplying in the multiplier circuit the short reciprocal of the operand by a first term equal to one half of the remainder value, the first term initially equal to the operand;
computing a partial root, the partial root comprising a sum of all appropriately shifted root digit values;
computing a new remainder as the difference between the remainder value and a product of the root digit value and a sum of the root digit value and a second term equal to twice the previous partial root, the second term initially equal to zero; and
generating a desired number of root digit values by reiterating the steps of inputting a short reciprocal, inputting a remainder value, computing a root digit value, computing a partial root and computing a new remainder, substituting a new remainder for the remainder value when reiterating the steps of inputting a remainder value, computing a root digit value and computing a remainder, the root digit values computed such that all subsequent remainders have magnitudes corresponding to less than one unit in the last place of a preceding root digit value.

53. The method of claim 52 wherein the step of computing a root digit value comprises the steps of:
selectively adding a digit bias adjustment factor to a product of the short reciprocal and the operand if the product is positive; and
truncating the product to a predetermined number of bits to generate the root digit value, the digit bias adjustment factor operable to offset error introduced by the truncation.

54. The method of claim 52 and further comprising the step of obtaining a short reciprocal of the operand.

55. The method of claim 54 wherein the step of obtaining a short reciprocal comprises the step of adding a reciprocal bias adjustment factor to a prior reciprocal approximation to yield a sum and truncating the sum to yield the short reciprocal, the reciprocal bias adjustment factor chosen to offset accumulated error in the prior reciprocal approximation and bias the short reciprocal to produce root digit values which, when accumulated to form a partial root, yield a partial root at most one unit greater than or exactly equal to an exact value of the square root truncated to a predetermined number of bits.

56. The method of claim 55 wherein the root digit values give rise to a negative remainder when the root digit values are greater than the exact value, the negative remainder causing a subsequent root digit value to be negative, thereby causing a product of the subsequent root digit and a term comprising the sum of the subsequent root digit and twice the previous partial root operable to reduce the magnitude of the negative remainder.

57. The method of claim 55 wherein the reciprocal bias adjustment factor is equal to the sum of a first and a second term, the first term equal to $2^{-k}$ in the Nth place where N is equal to the number of bits of the radix of the root digit values and k is a predetermined number of guard bits, the second term being large enough to bias the short reciprocal such that the short reciprocal is larger than an exact reciprocal of the square root of the operand and the second term being small enough to yield remainders corresponding to less than one unit in the last place of a preceding root digit value.

58. The method of claim 55, wherein the reciprocal bias adjustment factor is equal to the sum of a first term being $\frac{1}{4}$ of a unit in the Nth place and a second term being 164 of a unit in the Nth place.

59. The method of claim 52 wherein the final partial root is corrected by decrementing the final partial root by one unit in the last place if a final remainder generated is negative.

60. The method of claim 59 wherein if the final remainder is negative, the final remainder is corrected by adding twice the decremented final partial root plus one unit in the last place of the last root digit to said final remainder if said final remainder is negative.

61. The method of claim 54 wherein the step of obtaining a short reciprocal of the operand comprises the steps of:

retrieving a reciprocal seed value from a table containing a plurality of values;
computing a first reciprocal approximation equal to the product of the particular reciprocal seed value and the difference of three-halves and a second term, the second term being the product of the particular reciprocal seed value and a third term, the third term being the product of one-half of the operand and the particular reciprocal seed value; and
computing a second reciprocal approximation equal to the product of the first reciprocal approximation and the difference of three-halves and a fourth term, the fourth term being the product of the first reciprocal approximation and a fifth term, the fifth term being the product of one-half of the operand and the first reciprocal approximation.

62. The method of claim 61 wherein the step of obtaining a short reciprocal of the operand further comprises the step of:
computing the short reciprocal equal to the truncated sum of a prior reciprocal approximation and a reciprocal bias adjustment factor chosen to offset accumulated error in the prior reciprocal approximation and bias the short reciprocal to produce root digit values which, when accumulated to form a partial root, yield a partial root at most one unit in the last place greater than or exactly equal to the exact value of the square root truncated to a predetermined number of bits.

63. The method of claim 62 wherein the prior reciprocal approximation is equal to the second reciprocal approximation.

64. The method of claim 62, wherein the reciprocal bias adjustment factor is equal to the sum of a first term being $\frac{1}{4}$ of a unit in the Nth place and a second term being 1/64 of a unit in the Nth place.

65. The method of claim 54 wherein the step of obtaining a short reciprocal comprises the steps of:
retrieving a particular approximate reciprocal value approximately equal to a reciprocal of the square root of the operand from a table storing a plurality of the approximate reciprocal values; and
adding a reciprocal bias adjustment factor to the particular approximate reciprocal value to yield a sum and truncating the sum of yield the short reciprocal, the reciprocal bias adjustment factor chosen to offset error in the particular approximate reciprocal value and bias the short reciprocal to produce root digit values which, when accumulated to form a partial root, yield a partial root at most one unit in the last place greater than or exactly equal to the exact value of the square root truncated to a predetermined number of bits.

66. The method of claim 65 wherein the reciprocal bias adjustment factor is equal to the sum of a first and a second term, the first term equal to $2^{-k}$ in the Nth place where N is equal to the number of bits of the radix of the root digit values and k is a predetermined number of guard bits, the second term being large enough to bias the short reciprocal such that the short reciprocal is larger than an exact reciprocal of the square root of the operand and the second term being small enough to yield remainders corresponding to less than one unit in the last place of a preceding root digit value.

67. The method of claim 66 wherein the reciprocal bias adjustment factor is equal to the sum of a first term being ¼ of a unit in the Nth place and a second term being 1/64 of a unit in the Nth place.

68. The method of claim 54 wherein the step of obtaining a short reciprocal comprises the step of:

retrieving a short reciprocal approximately equal to a reciprocal of the square root of the operand from a table storing a plurality of short reciprocals, each of the short reciprocals comprising the truncated sum of an approximate reciprocal value and a bias adjustment factor chosen to offset error in the approximate reciprocal value and bias the short reciprocal to produce root digit values which, when accumulated to form a partial root, yield a partial root at most one unit in the last place greater than or exactly equal to the exact value of the square root truncated to a predetermined number of bits.

69. The method of claim 68 wherein the reciprocal bias adjustment factor is equal to the sum of a first and a second term, the first term equal to $2^{-k}$ in the Nth place where N is equal to the number of bits of the radix of the root digit values and k is a predetermined number of guard bits, the second term being large enough to bias the short reciprocal such that the short reciprocal is larger than an exact reciprocal of the square root of the operand and the second term being small enough to yield remainders corresponding to less than one unit in the last place of a preceding root digit value.

70. The method of claim 69 wherein the reciprocal bias adjustment factor is equal to the sum of a first term being ¼ of a unit in the Nth place and a second term being 1/64 of a unit in the Nth place.

71. The method of claim 54 wherein the step of obtaining a short reciprocal comprises the steps of:

retrieving a particular reciprocal seed value approximately equal to a reciprocal of the square root of the operand from a table storing a plurality of reciprocal seed values; and computing an approximate reciprocal value equal to the product of the particular reciprocal seed value and the difference of three-halves and a second term, the second term being the product of the particular reciprocal seed value and a third term, the third term being the product of one-half of the operand and the particular reciprocal seed value.

72. The method of claim 71 wherein the step of obtaining a short reciprocal further comprises the steps of:

adding a reciprocal bias adjustment factor to the approximate reciprocal value to yield a sum and truncating the sum to yield the short reciprocal, the reciprocal bias adjustment factor chosen to offset error in the approximate reciprocal value and bias the short reciprocal to produce root digit values which, when accumulated to form a partial root, yield a partial root at most one unit in the last place greater than or exactly equal to the exact value of the square root truncated to a predetermined number of bits.

73. The method of claim 72 wherein the reciprocal bias adjustment factor is equal to the sum of a first and a second term, the first term equal to $2^{-k}$ in the Nth place where N is equal to the number of bits of the radix of the root digit values and k is a predetermined number of guard bits, the second term being large enough to bias the short reciprocal such that the short reciprocal is larger than an exact reciprocal of the square root of the operand and the second term being small enough to yield remainders corresponding to less than one unit in the last place of a preceding root digit value.

74. The method of claim 73 wherein the reciprocal bias adjustment factor is equal to the sum of a first term being ¼ of a unit in the Nth place and a second term being 1/64 of a unit in the Nth place.

75. The method of claim 54 wherein the step of obtaining a short reciprocal comprises the steps of:

obtaining an approximate reciprocal value approximately equal to a reciprocal of the square root of the operand; and adding a reciprocal bias adjustment factor to the approximate reciprocal value to yield a sum and truncating the sum to yield the short reciprocal, the unique reciprocal bias adjustment factor chosen to offset error in the approximate reciprocal value and bias the short reciprocal to produce root digit values which, when accumulated to form a partial root, yield a partial root at most one unit in the last place greater than or exactly equal to the exact value of the square root truncated to a predetermined number of bits.

76. The method of claim 75 wherein the reciprocal bias adjustment factor is equal to the sum of a first and a second term, the first term equal to $2^{-k}$ in the Nth place where N is equal to the number of bits of the radix of the root digit values and k is a predetermined number of guard bits, the second term being large enough to bias the short reciprocal such that the short reciprocal is larger than an exact reciprocal of the square root of the operand and the second term being small enough to yield remainders corresponding to less than one unit in the last place of a preceding root digit value.

77. The method of claim 76 wherein the reciprocal bias adjustment factor is equal to the sum of a first term being ¼ of a unit in the Nth place and a second term being 1/64 of a unit in the Nth place.

78. The method of claim 52 wherein if a final remainder is negative, the final remainder is corrected by adding twice the decremented final partial root plus one unit in the last place of the last root digit to said final remainder if said final remainder is negative.

79. A method of calculating a square root of an operand using a rectangular array multiplier comprising the steps of:

obtaining a short reciprocal of the square root of the operand;

computing a first product by multiplying the short reciprocal by the operand;

adding a predetermined digit bias adjustment factor to the first product, truncating the first product to have less bits than the operand to yield a first root digit value;

computing in the rectangular array multiplier the square of the first root digit value;

computing a first remainder as the difference between the operand and the square of the first root digit value;

computing a subsequent product by multiplying the short reciprocal by the appropriately shifted first remainder;

selectively adding a predetermined digit bias adjustment factor to the subsequent product if the subsequent product is positive;

truncating the subsequent product to have less bits than the operand to yield a subsequent root digit value;

computing a partial root as the sum of all appropriately shifted root digit values;

computing a new remainder as the difference between the first remainder and the product of the subsequent digit value and the sum of the subsequent root digit value and twice the preceding partial root; and generating a desired number of root digit values by reiterating the steps of computing a subsequent product, selectively adding a predetermined digit bias adjustment factor, truncating the subsequent product, computing the product of the subsequent root digit value and the sum of the subsequent root digit value and twice the previous partial root and computing a new remainder, the first root digit value, the subsequent root digit value and all succeeding root digit values calculated such that subsequent remainders have magnitudes corresponding to less than one unit in the last place of a preceding root digit value.

80. The method of claim 79 wherein the step of computing the square of the first root digit value and the step of computing a first remainder are accomplished during a single multiplying step.

81. The method of claim 79 wherein the step of obtaining a short reciprocal of the operand comprises the step of adding a reciprocal bias adjustment factor to an approximate reciprocal to yield a sum and truncating the sum to yield the short reciprocal, the reciprocal bias adjustment factor chosen to offset accumulated error in the approximate reciprocal and bias the short reciprocal to produce root digit values which, when accumulated to form a partial root, yield a partial root at most one unit in the last place greater than or exactly equal to the exact value of the square root truncated to a predetermined number of bits.

82. The method of claim 80 wherein the root digit values give rise to a negative remainder when a root digit value is greater than the exact value of a particular root digit, the negative remainder causing a subsequent root digit value to be negative, thereby causing a product of the subsequent root digit and a term comprising the sum of the subsequent root digit value and twice the previous partial root operable to reduce the magnitude of the negative remainder.

83. The method of claim 82, wherein the reciprocal bias adjustment factor is equal to the sum of a first term being ¼ of a unit in the Nth place and a second term being 1/64 of a unit in the Nth place.

84. The method of claim 81 wherein the reciprocal bias adjustment factor is equal to the sum of a first and a second term, the first term equal to $2^{-k}$ in the Nth place where N is equal to the number of bits of the radix of the root digit values and k is a predetermined number of guard bits, the second term being large enough to bias the short reciprocal such that the short reciprocal is larger than an exact reciprocal of the square root of the operand and the second term being small enough to yield remainders corresponding to less than one unit in the last place of a preceding root digit value.

85. The method of claim 84, wherein the reciprocal bias adjustment factor is equal to the sum of a first term being ¼ of a unit in the Nth place and a second term being 1/64 of a unit in the Nth place.

86. The method of claim 79 wherein the step of obtaining a short reciprocal comprises the steps of:

retrieving a particular reciprocal seed value from a table containing a plurality of seed values;

computing a first reciprocal approximation equal to the product of the the particular reciprocal seed value and the difference of three-halves and a second term, the second term being the product of the particular reciprocal seed value and a third term, the third term being the product of one-half of the operand and the particular reciprocal seed value; and computing a second reciprocal approximation equal to the product of the first reciprocal approximation and the difference of three-halves and a fourth term, the fourth term being the product of the first reciprocal approximation and a fifth term, the fifth term being the product of one-half of the operand and the first reciprocal approximation.

87. The method of claim 86 wherein the step of obtaining a short reciprocal of the operand further comprises the step of:

computing the short reciprocal equal to the truncated sum of a prior reciprocal approximation and a reciprocal bias adjustment factor chosen to offset accumulated error in the prior reciprocal approximation and bias the short reciprocal to produce root digit values which, when accumulated to form a partial root, yield a partial root at most one unit in the last place greater than or exactly equal to the exact value of the square root truncated to a predetermined number of bits.

88. The method of claim 87 wherein the prior reciprocal approximation is equal to the second reciprocal approximation.

89. The method of claim 79 wherein the square root is corrected by decrementing a final partial root generated by one unit in the last place if a final remainder generated is negative.

90. The method of claim 89 wherein if the final remainder is negative, the final remainder is corrected by adding twice the decremented final partial root plus one unit in the last place of the last root digit to said final remainder if said final remainder is negative.

91. The method of claim 79 wherein if the final remainder is negative, the final remainder is corrected by adding twice the decremented final partial root plus one unit in the last place of the last root digit to said final remainder if said final remainder is negative.

92. A circuit for calculating an exact square root of an operand, comprising:

a multiplier circuit;

circuitry for obtaining a short reciprocal of the square root of the operand;

circuitry, including said multiplier circuit, for computing a root digit value by multiplying a short reciprocal of the square root of the operand by an appropriately shifted remainder value initially equal to said operand;

circuitry, including said multiplier circuit, for computing a new remainder as the difference between said remainder value initially equal to said operand and a product of the root digit value and a sum of the root digit value and a term equal to twice the sum of all appropriately shifted preceding root digits values, said term initially equal to zero;

circuitry for generating a succeeding root digit value by substituting said new remainder for said remainder value and inputting said new remainder into said circuitry for computing a root digit value, said root digit value and said succeeding root digit value computed such that all remainders have magnitudes corresponding to less than one unit in the last place of a preceding root digit value; and circuitry for computing a partial root, said partial root comprising a sum of all appropriately shifted root digit values.

* * * * *

UNITED STATES PATENT AND TRADEMARK OFFICE
CERTIFICATE OF CORRECTION

PATENT NO. : 5,060,182

DATED : October 22, 1991

INVENTOR(S) : Willard S. Briggs et al.

It is certified that error appears in the above-identified patent and that said Letters Patent is hereby corrected as shown below:

Column 16, claim 13, line 28, after "claim" delete "11" and insert -- 12 --.

Column 20, claim 40, line 59, after "claim" delete "40" and insert -- 39 --.

Column 27, claim 82, line 34, after "claim" delete "80" and insert -- 81 --.

Signed and Sealed this

Twenty-eighth Day of September, 1993

Attest:

BRUCE LEHMAN

Attesting Officer

Commissioner of Patents and Trademarks